March 8, 1949.  S. MYERSON ET AL  2,463,550

METHOD OF MAKING ARTIFICIAL TEETH

Filed May 15, 1947

Inventor
Simon Myerson
Richard L. Myerson
By Roberts, Cushman & Grover
Att'ys.

Patented Mar. 8, 1949

2,463,550

UNITED STATES PATENT OFFICE 2,463,550

METHOD OF MAKING ARTIFICIAL TEETH

Simon Myerson and Richard L. Myerson,
Brookline, Mass.

Application May 15, 1947, Serial No. 748,305

4 Claims. (Cl. 18—55.1)

This invention relates to a novel method of making artificial teeth and portions thereof.

For several uses it has been found desirable to provide a portion or portions at least of an artificial tooth with retentive cells and to substantially fill such cells with a material having different characteristics from the material of the tooth portion in which the cells are formed. For example, the gingival or basal portion of a tooth may be provided with such cells for a considerable depth, they may be filled with a thermoplastic resin, such as polymerized methyl methacrylate and the tooth may then be secured to the oral support by causing a cohesive bond or molecular union of the tooth and the support during the usual process of packing and processing the denture. Another example is the provision of such cells at the occlusal region of a ceramic tooth and substantially filling them with a resin or other suitable material, thereby to provide a softer biting surface which more closely approximates in hardness the hardness of a natural tooth. Another example is the provision of such cells in the enamel simulating portion of an artificial tooth and filling them with a material having color or light reacting characteristics which differ from the corresponding characteristics of the material in which the cells are formed thereby providing a stippled appearance either throughout the labial face or in localized areas thereof. Such artificial teeth are claimed and are more fully illustrated and described in co-pending application of Simon Myerson, Serial No. 39,258, filed July 17, 1948, now U. S. Patent No. 2,288,755, entitled Artificial tooth and method of uniting an artificial tooth to a tooth support.

In said copending application several methods are disclosed by which artificial teeth with such cells may be made, one of which is the use of granules of cork or of other filler materials which are burned out after the tooth is biscuited. That method is subject to several defects. In the first place, cork will not mix evenly with a ceramic material because it is extremely light and irregular in shape. In the second place, during the initial stages of firing a biscuit tooth, the ceramic binders in common use burn out and at such stage the ceramic materials are very loosely held together so that the forces created by combustion of the granules of filler material sometimes cause portions of the cellular ceramic structure to collapse or break away. The method of this invention obviates these defects and it is so efficient that retentive, intercommunicating cells may be created throughout the entire ceramic structure of the tooth and the cells may be filled to an extent approximating 98% of the voids thereof. The resultant tooth is strong, durable and substantially free of unfilled cells.

The present invention has for one of its objects the provision of an economical method of making a ceramic artificial tooth having cells in a portion at least of the tooth, and substantially filling said cells with a material having different characteristics from the ceramic material in which the cells are formed.

Other objects are the provision of a method of forming in an artificial tooth or a portion at least thereof, cells which are generally spherical in shape, and the provision of a method for forming such cells which are interconnected and are substantially uniformly distributed throughout any desired portion of the tooth.

Another object is the provision of a method of substantially filling the cells of a ceramic tooth portion with a polymerizable compound adapted to produce a resin and polymerizing or hardening the resin contained in the cells without leaving substantial voids therein.

Another object is to provide a method or methods which eliminate the defects of the aforesaid proposed method and which are capable of economical use in the manufacture of artificial teeth.

Other and further objects and advantages of the invention will be apparent from the following description and by reference to the accompanying drawing in which.

Figure 2:
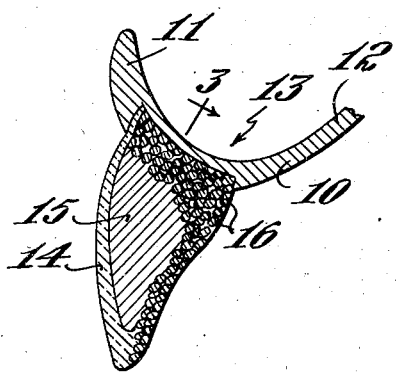
Fig. 2 is a labio-lingual vertical section of an anterior artificial tooth secured to an oral support, the tooth being provided with a ceramic portion having interconnected generally spherical cells which may be made and substantially filled with cell-filling material by the methods of this invention.
Figure 3:
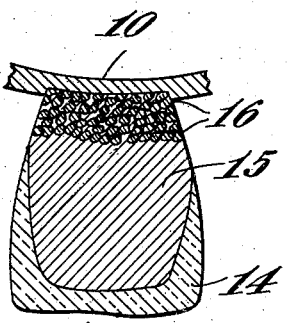
Fig. 3 is a section on the lines 3—3 of Fig. 2.

Referring to Figs. 2 to 3 of the drawings, the numeral 10 designates a portion of an oral support, in this case an upper plate, which is made of any suitable material, for example a synthetic resin such as polymerized methyl methacrylate. The forward portion 11, in use, is disposed at the labial surface of the gum ridge, and the rear portion 12 is designed to engage the surface of the palate, these two portions merging to form the channel 13 for the reception of the crest of the gum ridge.

Figure 1:
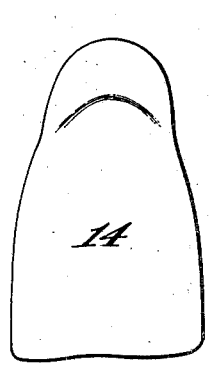
Fig. 1 is a front elevation of an artificial tooth.

The artificial tooth illustrated in Figs. 1 and 2 of the drawings may consist of three elements, the enamel-simulating portion 14 which is preferably made of a substantially transparent porcelain (see U. S. Patents 2,207,712, 2,202,713, 2,230,164 and Reissue 22,331); the dentine-simulating portion 15 which may be made of ceramic material; and the material 16 which substantially fills a multitude of intercommunicating cells generally spherical in shape, which have been provided in the gingival portion of the tooth and in the lingual portion of the tooth. The material 16 at the basal or gingival portion of the tooth is of a character such that it will firmly unite, preferably to form either a cohesive bond or a molecular union with the material of the plate or oral support in which the tooth is to be mounted. For example, it may be made of polymerized methyl methacrylate when the tooth is to be utilized in connection with a plate or other oral support of polymerized methyl methacrylate. In any case the material filling the cells at the basal portion of the tooth should be a synthetic resin (which term as used herein includes copolymers, interpolymers and mixtures of resins) which is such that a cohesive bond or molecular union may be formed between it and the material of oral supports commonly in use.

In use the gingival surface of the tooth may be ground to the extent necessary for proper mounting of the tooth, and the tooth may thereafter be joined to the material of the oral support during the usual process of packing and processing the denture which ordinarily produces sufficient heat and pressure to cause the material 16 at the basal portion of the tooth and the material of the oral support to coalesce or molecularly join. This method is claimed in said copending application Serial No. 39,258. No loss of retention will be caused by such grinding unless the grinding goes below the portion of the tooth in which the cells have been formed and filled. The cells may be formed and filled to any required depth, or throughout the entire tooth, if desired.

The material 16 filling the cells at the biting or occlusal portions of the tooth should be a softer material than the ceramic materials in which the cells are formed in these locations, so that the resultant combination of the ceramic and the cell-filling materials at the occlusal portion of the tooth presents a softer surface than one which is composed solely of ceramic materials thereby reducing the wear on the occlusal surface of the natural tooth or teeth which bite against it. While the above mentioned synthetic resins are suitable for this purpose, other flowable materials which set and harden may also be used.

The same materials may be used to fill the cells provided at or near the labial face of the enamel-simulating portion of an artificial tooth to provide the stippled visual effect described above.

Figure 4:
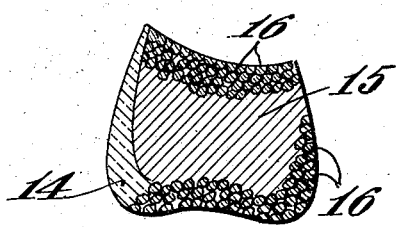
Fig. 4 is a labio-lingual vertical section of a posterior artificial tooth, the tooth being provided with ceramic portions having interconnected generally spherical cells which may be made and substantially filled with cell-filling material by the methods of this invention.

The tooth illustrated in Fig. 4 is a posterior tooth wherein the basal portion of the dentine-simulating part of the tooth has been provided with intercommunicating cells which are substantially filled with a material 16 capable of molecular union with or forming a cohesive bond with the oral support (as described above), and the occlusal portion of the tooth has been provided with intercommunicating cells which are filled with a material 16 which is softer than the material in which the cells are formed (as described above) so that the hardness of the occlusal surface may be controlled to approximate the hardness of the occlusal surface of the natural tooth.

Figure 5:
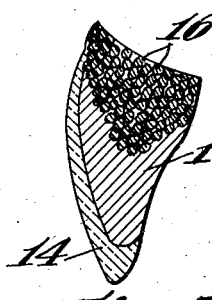
Fig. 5 is a labio-lingual vertical section of an anterior tooth having a ceramic portion provided with interconnected generally spherical cells which may be made and substantially filled with a cell-filling material by the methods of this invention.
Figure 6:
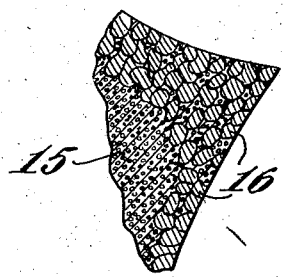
Fig. 6 is an enlarged section of a portion of the teeth of Figs. 2 to 5 inclusive illustrating the shape and distribution of the cells and the cell-filling material.

The tooth illustrated in Fig. 5 of the drawings is an anterior tooth having substantially spherical cells formed in the basal or gingival locality of the tooth. This tooth is similar in construction to that illustrated in Figs. 2 and 3 except that the cells do not extend downwardly along the lingual surface of the tooth to the incisal edge thereof and they extend deeper from the basal part into the central part of the dentine-simulating portion 15.

The method of this invention may be utilized to make artificial teeth such as are illustrated in Figs. 2 to 6 inclusive of the drawings as well as artificial teeth having cells located at other localities or portions thereof, for example, on the labial surface of the enamel-simulating portion, slightly below the labial surface of the enamel-simulating portion of the tooth or in any locality of the tooth to any extent desired.

According to the preferred method of this invention the cells are formed by mingling with ceramic materials particles of a cell-forming material to form a slip, the cell-forming material being capable of being removed by a solvent which is substantially non-reactive with the binder for the ceramic materials of the slip, i. e., which does not deform or otherwise adversely affect the ceramic tooth structure during the process step of dissolving out and substantially removing the particles of cell-forming material.

Referring to the tooth illustrated in Figs. 2 and 3 of the drawings the enamel-simulating portion 14 of the tooth may be formed of a slip consisting of feldspar and a binder such as starch, gum tragacanth, flour, casein or the like, or any other suitable ceramic material and binder; the non-cellular portion of the dentine-simulating part of the tooth 15 may be made of a slip consisting of fifty parts by weight of feldspar, forty-five parts by weight of silica and five parts by weight of kaolin plus a suitable binder as disclosed above; and the slip which is to form the cells may consist of fifty parts by weight of the aforesaid dentine-simulating ceramic slip and fifty parts by weight of substantially spherical particles of a synthetic resin having a particle size of from five one thousandths (.005) of an inch to fifty one thousandths (.050) of an inch inclusive, the range of from five to twenty-five one thousandths (.005 to .025) of an inch inclusive being preferable.

The substantially spherical particles of synthetic resin are thoroughly mixed with the ceramic slip to provide the cell-forming slip, then the enamel-simulating slip, the dentine-simulating slip and the cell-forming slip are moulded in any manner usual in the trade by well known two, three or four part moulds to form an appropriate shape of the tooth and then the mould is heated to harden the ceramic portions of the tooth; for example, by heating for approximately three minutes at a temperature of approximately 300° F. The tooth (which may be called a "biscuit" tooth) is then removed from the mould and placed in a solvent for the synthetic resin which is substantially nonreactive with the binder for the ceramic materials of the slip; for example, dioxane, benzene, alcohol, or a monomer of the synthetic resin, until the resin particles have been substantially dissolved out of and removed from the ceramic structure. The tooth may then be dried by warm air, or it may be immediately vitrified by firing in the customary manner or by any other appropriate treatment.

The resultant tooth includes a ceramic portion having interconnected generally spherical cells which are substantially uniformly distributed throughout the portion where the cell-forming slip was placed during moulding of the tooth.

The teeth of Figs. 4 and 5 may be made by the same method by appropriately locating the cell-forming mix in the tooth moulds.

While we prefer to use as the cell-forming material for mixing with the ceramic slip particles of synthetic resins such as polymerized methyl methacrylate, polystyrene, polyvinyl acetate, polyvinyl chloride, or a mixture of such synthetic resins, particles of any desired material may be used so long as they are capable of being dissolved out of the hardened tooth by a solvent which will not adversely affect the ceramic materials which constitute the walls of the cells nor the binder for such ceramic materials. When utilizing starch, gum tragacanth, flour or casein as the binder, suitable solvents are: (i) either methyl methacrylate monomer or dioxane for methyl methacrylate, (ii) benzene for polystyrene and (iii) alcohol for polyvinyl acetate and polyvinyl chloride.

Instead of using starch, gum tragacanth, flour, casein, or the like as the binder for the ceramic materials a binder such as urea formaldehyde, phenol formaldehyde, melamine formaldehyde, or a phenolic resin may be used, and with such a ceramic mix the granules of cell-forming material may consist of a water soluble salt such as sodium chloride, sodium phosphate, sodium acetate or sodium bicarbonate or a water soluble polyvinyl alcohol and water may subsequently be used as the solvent to remove the cell-forming material. The ingredients are mixed and moulded as described above, the ceramic structure is hardened by heating, and the cell-forming material is dissolved out by treating the tooth with water or any other appropriate solvent which does not adversely affect the ceramic materials nor their binder. The tooth may then be vitrified as described above. However, organic cell-forming materials are preferred and organic solvents are preferred.

Generally spherical particles are preferable for the cell-forming material because they may be more uniformly mixed with the ceramic slip thereby to provide interconnecting cells which are generally spherical in shape so that the resultant tooth structure has a more uniform strength and the resultant cells are retentive in shape. However, the scope of this invention is not limited to the use of generally spherical particles of cell-forming material.

When spherical particles of polymerized methyl methacrylate are used many of them retain their original spherical shape during the moulding operation while others become more or less ovoid and some are indented due to the pressure exerted upon them during the moulding operation. However, such distortion is insufficient to substantially detract from the strength of the tooth or the retentiveness of or the intercommunication between the cells. The cellular structure shown in Fig. 6 generally illustrates substantially the amount of interconnection and substantially the amount of distortion of the spherical nature of the cells which result from the use of substantially spherical polymerized methyl methacrylate particles, moulding the slip at the usual pressures, hardening the ceramic mix and then removing the particles with a solvent consisting of a monomer of methyl methacrylate.

The foregoing examples of ceramic enamel-forming mix and ceramic dentine-simulating mix are only by way of example since a considerable number of variations may be used. The particle size of the ceramic materials is preferably less than the particle size of the cell-forming materials which are added to the mix to form the portion of the tooth in which the cells are desired to permit the ceramic materials to substantially fill the voids between the larger cell-forming particles. The preferred sizes of the cell-forming particles are as stated above. The relative proportions between the ceramic slip and the added particles may vary above or below fifty per cent by weight, but the proportion is preferably such that the resultant cells will intercommunicate to provide a honeycombed structure, thereby to provide cells which are retentive in shape and a cellular structure which may be substantially filled with the desired material during the subsequent steps of the method.

The subsequent steps of the method comprise substantially filling the cells with an appropriate material having different characteristics from the material forming the walls of the cells and hardening the cell-filling material. The cells may be filled with cell-filling material 16 by any appropriate method such as injection or compression moulding or evacuating the cells by subjecting the tooth to negative pressure (which term in this specification means any pressure below atmospheric) while the tooth is submerged in a bath of cell-filling material and thereafter forcing the material into the cells by subjecting the bath to a pressure which is greater than said negative pressure. The cell-filling material is then hardened in the cells.

Figure 7:
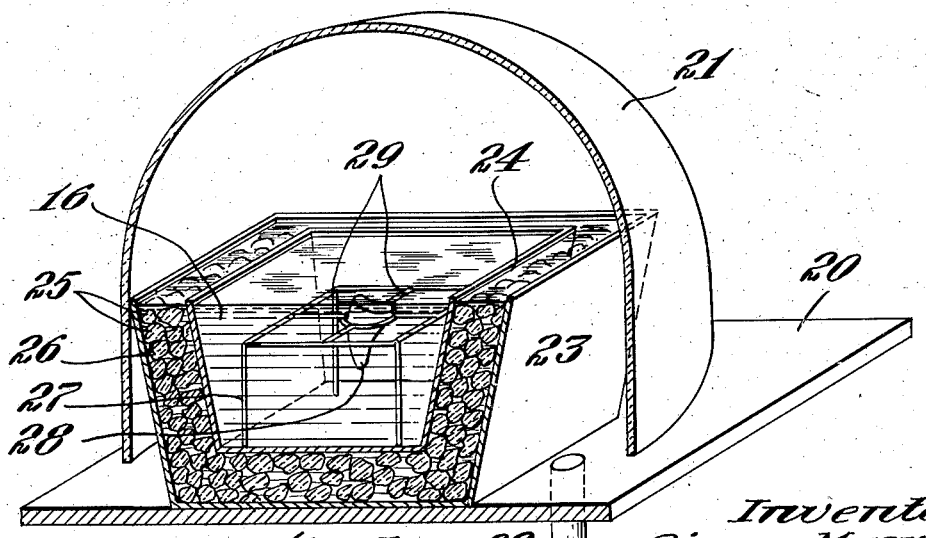
Fig. 7 is a perspective view of one form of apparatus useful in carrying out certain steps of the methods of this invention, parts being broken away and shown in section.

In Fig. 7 of the drawings an apparatus is illustrated which may be used in performing said negative and increased pressure steps which are not claimed per se herein but which form the subject matter of a copending application of Simon and Martin S. Myerson entitled Method of making artificial tooth, Serial No. 748,304, filed concurrently herewith. This apparatus consists of a base plate 20, a removable vacuum bell 21, preferably made of glass or other transparent material, and a conduit 22 which affords communication through the base plate 20 between the interior of the vacuum bell 21 and a pump or other suitable device (not shown) for evacuating the interior of the vacuum bell. A container 23 rests upon the base plate 20 and is located within the confines of the vacuum bell 21. A mixture of ice 25 and alcohol 26 is placed in the container 23 and a container 24 is set in the mixture. A rack 27 rests upon the bottom of the container 24 and this rack is provided with crossbars 29 which are joined to provide a support for an artificial tooth 28. The container 24 is substantially filled with a bath of the cell-filling material 16 which is to be incorporated in the cells of the tooth structure.

The cell-filling material 16 is preferably selected from the group consisting of a resin in flowable state, a compound adapted to produce a resin, a solution of a resin, or a solution of a partially polymerized resin-forming material capable of undergoing further polymerization. An example of such a resin in flowable state is ethyl cellulose, used as a hot melt; examples of such compounds adapted to produce a resin are vinyl compounds such as methyl methacrylate monomer, styrene monomer, vinyl acetate monomer, vinyl chloride monomer or an allyl monomer; examples of solutions of a resin are solutions of polymerized vinyl compounds in monomers thereof; and examples of solutions of partially polymerized resin-forming materials capable of undergoing further polymerization are partially polymerized vinyl compounds in monomers of such vinyl compounds. It is understood that, if desired, co-polymerizable or inter-polymerizable compounds or mixtures thereof may be used so long as they are capable of producing a resin of the characteristics desired in the portion of the tooth which is being filled, for example, copolymers of styrene and divinyl benzene or of methyl methacrylate and glycol dimethacrylate may be used where thermohardening materials are desired.

At the basal portion of the tooth thermoplastic resins are preferable because methyl methacrylate is the most popular material now used for oral supports. Preferably, in utilizing said negative pressure method, the bath 16 contains partially polymerized compounds so as to increase the viscosity of the bath, decrease evaporation and reduce shrinking during subsequent steps.

The tooth 28 which has been provided with a portion at least having intercommunicating cells is placed in the rack 27 and completely submerged in the bath 16 as shown in Fig. 7. The air in the vacuum bell 21 is then evacuated through the conduit 22 to produce a negative pressure (below atmospheric) therein, for example, of the order of a fraction of an inch of mercury. This causes the air to be substantially evacuated from the cells of the tooth and the negative pressure is maintained until bubbles cease to rise from the tooth. The ice 25 and alcohol 26 cool the material of the bath 16 and prevent its boiling during this period of reduced pressure. After the air has been substantially evacuated from the cells the negative pressure is released and atmospheric pressure is admitted to the vacuum bell. This causes the flowable compound 16 to penetrate and substantially fill the cells of the tooth. In use of resins in fluid state such as a hot melt of ethyl cellulose polymer the mixture of ice 25 and alcohol 26 is omitted and a warming medium may be supplied in the container 23 instead of a cooling medium.

After the tooth has been allowed to remain submerged in the bath at atmospheric pressure for a sufficient period to accomplish the desired penetration, for example ten minutes, the holder 27 carrying the tooth is removed and placed in a bath of a non-reactive fluid, such as Turkey red oil, glycerine, castor oil or oil of paraffin, and the compound 16 which is located in the cells is then hardened to the desired extent, for example, it is polymerized by heating this bath. The tooth is then removed and any excess of resin on the exterior surface of the tooth is removed.

To insure more complete filling of the cells, the vacuum dipping may be repeated; also positive pressure (i. e. above atmospheric) may be introduced into the vacuum chamber.

The function of the oil bath is to prevent surface evaporation of the cell-filling material during polymerization. Any other appropriate liquid may be substituted for the aforesaid liquids so long as it is non-reactive with the cell-filling material and non-volatile at the hardening or polymerization temperature of the cell-filling material.

As above stated the cell-filling material 16 may be introduced into the cells by injection or compression moulding procedures as commonly used in the moulding of plastics, in which event the hardening step may be carried out by merely cooling the tooth or, if unpolymerized or partially polymerized materials are used, the tooth may be subjected to the above described polymerizing step.

From the foregoing it will be apparent that this invention provides an economical method of making an artificial tooth having interconected cells throughout or in a portion thereof and for substantially filling such cells with a material having different characteristics from the material of the tooth portion in which the cells are formed, and that such method eliminates the defects of the other methods referred to earlier in the specification.

While certain materials have herein been specifically referred to, it is obvious that for certain purposes at least of this invention, e. g. visual effect and occlusal hardness effect, the cell-filling material need not be capable of forming a cohesive bond or a molecular union with the material of the oral support and therefore may be chosen from a great variety of materials not herein mentioned. Though various tooth portions which may be filled have been illustrated, the entire ceramic structure may be made cellular and substantially filled.

While certain desirable method steps have been illustrated by way of example, it is to be understood that the invention is not limited to such method steps but is to be regarded as broadly inclusive of any and all equivalent steps and methods falling within the scope of the appended claims.

We claim:

1. The method of making an artificial tooth comprising the steps of mingling with the ceramic slip which is to form a portion at least of the artificial tooth particles of a cell-forming material, moulding the slip, hardening the slip, substantially removing said particles of cell-forming material by treatment with a solvent therefor, vitrifying the ceramic tooth portion whereby a hard ceramic tooth portion at least is provided containing a series of cells, and substantially filling the cells with material having different characteristics than the material of the tooth portion in which the cells are formed.

2. The method of making an artificial tooth comprising the steps of mingling with the ceramic slip which is to form a portion at least of the artificial tooth substantially spherical particles of a cell-forming material, moulding the slip, hardening the slip, substantially removing said particles of cell-forming material by treatment with a solvent therefor, vitrifying the ceramic tooth portion whereby a hard ceramic tooth portion at least is provided containing a series of cells which are generally spherical in shape, and substantially filling the cells with a cell-filling material having different characteristics than the material of the tooth portion in which the cells are formed.

3. A method of making an artificial tooth comprising the steps of mingling with the ceramic slip which is to form a portion at least of the artificial tooth particles of a cell-forming material, moulding the slip, hardening the slip, substantially removing said particles of cell-forming material by treatment with a solvent therefor, vitrifying the ceramic tooth portion whereby a ceramic tooth portion at least is provided containing a series of cells, and substantially filling the cells with a cell-filling material comprising methyl methacrylate.

4. A method of making an artificial tooth comprising the steps of mingling with the ceramic slip which is to form a portion at least of the artificial tooth substantially spherical particles of a cell-forming material, moulding the slip, hardening the slip, substantially removing said particles of cell-forming material by treatment with a solvent therefor, vitrifying the ceramic tooth portion whereby a hard ceramic tooth portion at least is provided containing a series of cells which are generally spherical in shape, and substantially filling the cells with a cell-filling material comprising methyl methacrylate.

SIMON MYERSON.
RICHARD L. MYERSON.

REFERENCES CITED

The following references are of record in the file of this patent:

UNITED STATES PATENTS

| Number | Name | Date |
|---|---|---|
| 916,409 | Begle | Mar. 30, 1909 |
| 1,344,324 | Walter | June 22, 1920 |
| 1,960,440 | Hoevel | May 29, 1934 |
| 2,105,567 | Webb | Jan. 18, 1938 |
| 2,193,808 | Dieterich | Mar. 19, 1940 |
| 2,232,041 | Webb | Feb. 18, 1941 |
| 2,364,317 | Schaefer | Dec. 5, 1944 |

FOREIGN PATENTS

| Number | Country | Date |
|---|---|---|
| 10,770 | Australia | Feb. 22, 1934 |

Certificate of Correction

Patent No. 2,463,550.

March 8, 1949.

SIMON MYERSON ET AL.

It is hereby certified that error appears in the printed specification of the above numbered patent requiring correction as follows:

Column 1, line 35, for the patent number "2,288,755" read *2,463,549*; and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*